United States Patent
Long

[19]

[11] Patent Number: 6,134,265
[45] Date of Patent: *Oct. 17, 2000

[54] PRECODING COEFFICIENT TRAINING IN A V.34 MODEM

[75] Inventor: Guozhu Long, Raleigh, N.C.

[73] Assignee: Cirrus Logic, Inc., Austin, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/775,769

[22] Filed: Dec. 31, 1996

[51] Int. Cl.[7] ....................................................... H04B 1/38
[52] U.S. Cl. ......................... 375/222; 375/231; 375/285; 375/296; 375/350; 708/320; 708/323
[58] Field of Search ..................................... 375/219, 222, 375/285, 296, 346, 350, 231; 364/724.011, 724.17; 708/300, 320, 322, 323

[56] References Cited

U.S. PATENT DOCUMENTS

| | | | |
|---|---|---|---|
| 5,283,811 | 2/1994 | Chennakeshu et al. | 375/229 |
| 5,388,124 | 2/1995 | Laroia et al. | 375/286 |
| 5,396,519 | 3/1995 | Betts et al. | 375/296 |
| 5,615,298 | 3/1997 | Chen | 704/228 |
| 5,693,901 | 12/1997 | Matsunaga | 84/603 |

OTHER PUBLICATIONS

International Telecommunications Union Telecommunications Standardization Sector Issued Recommendation V.34 entitled "A Modem Operating at Data Signaling Rates of Up to 33600 bit/s For Use on the General Switched Telephone Network and on Leased Point–to–Point 2–Wire Telephone––Type Circuits" (originally adopted in 1994, and revised in early 1996).

*Primary Examiner*—Amanda T. Le
*Attorney, Agent, or Firm*—J. P. Violette; Peter Rutkowski; David L. Stewart

[57] ABSTRACT

A V.34 compliant modem uses a noise whitening filter to compensate for noise enhancement in an equalizer. The noise whitening filter uses a 3 tap FIR the response of which is determined by 3 coefficients. The coefficients are derived using a newly developed extension of the Levinson–Durbin algorithm to complex numbers. The coefficients thus derived are used to control the precoder as well as the noise whitening filter. The coefficients are also used to control precoding reconstruction after the decoder.

21 Claims, 6 Drawing Sheets

PRECODING COEFFICIENT TRAINING IN A V.34 MODEM

TECHNICAL FIELD

The invention relates to telecommunications, and, more particularly, to modems which employ precoding technology.

BACKGROUND ART

The International Telecommunications Union Telecommunications Standardization Sector issued recommendation V.34 entitled "A Modem Operating at Data Signaling Rates of Up to 33,600 bit/s For Use on the General Switched Telephone Network and on Leased Point-to-Point Wire Telephone-Type Circuits." The V.34 recommendation was originally adopted in 1994, and revised in early 1996. That standard is hereby incorporated by reference in its entirety.

The V.34 recommendation is the first modem standard which is able to fully adapt to channel characteristics. Among others, V.34 will adjust to carrier frequency, the symbol rate and the transmitted power to optimally fit into the communications channel. V.34 uses a method of handshaking grouped into four phases:

Phase 1: Network interaction(V.8 handshake)

Phase 2: Line probing

Phase 3: An equalizer and echo canceler training

Phase 4: Final training.

The equalizer and echo canceler training is sometimes referred to as half duplex training and the final training is sometimes referred to as full duplex training.

In phase 1, call and answer modems exchange initial handshaking signal using V.8, which was introduced together with V.34 to define the information sequences exchanged. V.8 uses the 300-bps standard V.21 to exchange information with a remote modem on available modulation modes and supported standards and what kind of error correction is to be used, among others.

During the line probing phase, the modem sends regularly spaced tones (every 150 hertz, covering the whole channel bandwidth). Due to the limited bandwidth and channel distortion, each and every one of the probing tones is altered in a different way. This allows one to determine the useable bandwidth and the optimal carrier frequency (which should be centered in the used bandwidth). Each of these tones is sent twice, at two volume levels, which allows one to estimate the influence of nonlinear distortion on the line. What's more, since the tones are at distinct frequencies, it even allows one to estimate the noise present on the line. These estimates can be used to determine the optimal transmit level. At the end of Phase II, two modems will exchange the results in the "INFO 1" sequence. Among the exchanged information are transmit power, carrier frequency, symbol rate and maximum data rate.

During equalizer and echo canceler training, the receiver equalizer starts to adapt to the channel characteristics and the echo canceler starts to adapt to the echo path characteristics. The echo canceler is a device (actually a digital filter) that gets rid of echo effects on analog phone lines and is important for the full-duplex modems to work efficiently. Without an echo canceler, a modem would hear the echoes of its own transmitted signal as well as the remote signal transmitted by the remote modem, and likely become confused. The equalizer compensates the channel distortion, and thus removes the inter-symbol interference in the received signal to help the correct reception of the remotely transmitted data signal. Such an equalizer is typically a linear digital adaptive filter whose transfer function should be close to the inverse of that of the transmission channel. As a result, the noise at the input to the equalizer, which is typically assumed to be white, will be enhanced by the equalizer, especially when the channel's amplitude distortion is relatively severe. To avoid this problem, V.34 includes an optional technique called precoding. The receiver needs to determine the values for coefficients of a filter based on the noise characteristics at the equalizer output, which is put at the output of the equalizer to whiten and thus reduce the colored noise at the equalizer output, helping the decoder to make correct decisions. The coefficients for the receiver for the noise whitening filter are also sent to the remote modem's transmitter, and used there in a device called a precoder.

During the final training phase, the echo canceller and equalizer coefficients are further refined. The precoding coefficients can be calculated after the echo canceller and equalizer coefficients are stabilized. Then two modems exchange modem parameter sequence MP, which includes modulation and encoding parameters like constellation size, type of trellis encoder, nonlinear encoding and precoding coefficients. A plurality of data rates, symbol rates, and various signal processing techniques permit an optimal fit in almost every channel.

Although the V.34 recommendation specifies the transmit end, the receive end is mostly not specified. Thus, implementers are left to design a receiver which will handle the specified transmitter characteristics as best they can.

SUMMARY OF THE INVENTION

In accordance with the invention, a V.34 compliant receiver is disclosed which employs precoding and interacts with the V.34 transmitter to ensure reliable and efficient communications.

An advantage of the invention resides in the use of a noise whitening filter for improving the response of a V.34 transmitter receiver pair during communications across the channel. A noise whitening filter utilizes a set of coefficients derived in a new and efficient way using the current invention which give improved results.

The invention is directed to methods, apparatus, systems and computer program products for operating a communications system including a transmitter having a precoder and a receiver having a noise whitening filter, by setting the response of the noise whitening filter with coefficients derived using a recursive algorithm such as an extension of the Levinson-Durbin algorithm to complex numbers, and setting the response of the precoder using the same coefficients.

Still other objects and advantages of the present invention will become readily apparent to those skilled in the art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

DETAILED DESCRIPTION OF THE PREFERRED EMBODIMENTS

Figure 1A:
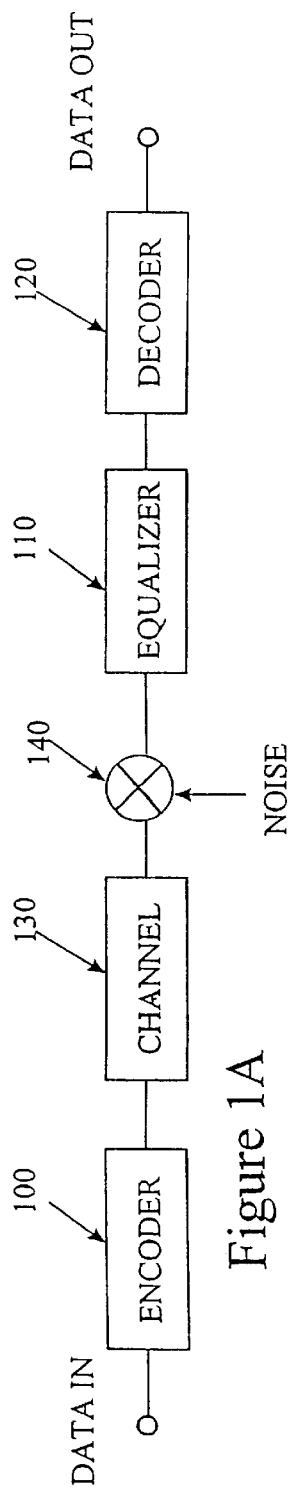
FIG. 1A is a block diagram of a modem encoder connected to a modem decoder over a communications channel which includes an equalizer before the modem decoder.

FIG. 1A is a block diagram of a modem encoder connected to a modem decoder, over a communications channel 130, which includes an equalizer. Data is supplied to encoder 100 and it is transmitted over transmission channel 130. Transmission channels are typically noisy as indicated by the noise addition at 140. An equalizer 110 attempts to compensate for irregularities in the channel transfer function before providing signal to the decoder 120 for extraction of the data and its output.

Figure 1B:
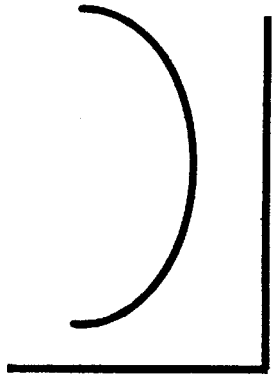
FIG. 1B is an illustration of an exemplary transfer function of the communications channel.

FIG. 1B is an illustration of the transfer function of a typical communications channel, such as channel 130 of FIG. 1A. As can be seen, the channel has a pass band and the channel response rolls off on either end of the spectrum depending on how the channel is implemented. Thus, very low frequency components are attenuated or transferred with less facility than those in the center of the channel pass band. Similarly, at the high end, high frequency components are attenuated.

Figure 1C:
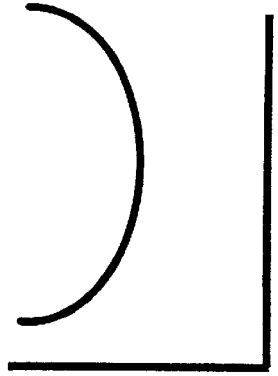
FIG. 1C is an illustration of an exemplary transfer function of an equalizer.

FIG. 1C is an illustration of a transfer function of an equalizer. The purpose of the equalizer is to compensate for irregularities in the channel transfer function. Thus, where low frequency signals and high frequency signals are attenuated by the transfer function of the channel, the equalizer will attempt to reverse that process and emphasize or amplify those portions of the signal. Thus, if the transfer function of the channel is $H(z)$, the transfer function of the equalizer should be close to the inverse or $1/H(z)$.

Figure 1D:
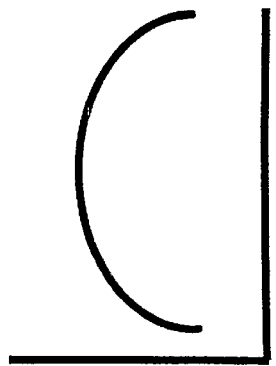
FIG. 1D is an illustration of a noise spectrum experienced on a transmission channel at the input to the equalizer.

FIG. 1D is an illustration of a noise spectrum experienced on a transmission channel at the input to the equalizer. Essentially, the noise illustrated is "white" noise, which means that it has a uniform distribution over the channel bandwidth of interest.

Figure 1E:
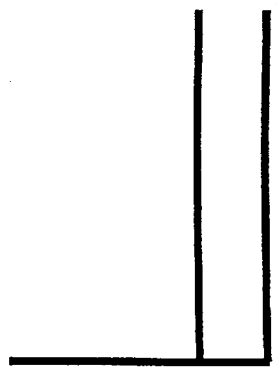
FIG. 1E is an illustration of a channel noise spectrum after it has passed through an equalizer.

FIG. 1E is an illustration of a channel noise spectrum after it has passed through an equalizer. As indicated in the discussion of FIG. 1C, the equalizer attempts to compensate for attenuation introduced by the channel bandwidth. As a result, it tends to amplify more of the frequency components at the low end and the high end of the channel bandwidth. As a result, since noise levels are the same over the entire channel pass band, after equalization, the noise signal levels at the low end of the spectrum and the high end of the spectrum will be amplified more than the noise components in the middle of the channel pass band. Thus, the noise no longer has a uniform distribution and may be considered to be "colored" noise. Because the spectrum of the noise after passing through the equalizer is not uniform, the output of the equalizer includes colored noise components. Essentially, this means that the noise signals are correlated or to some extent can be predicted in advance because of that correlation.

Figure 2:
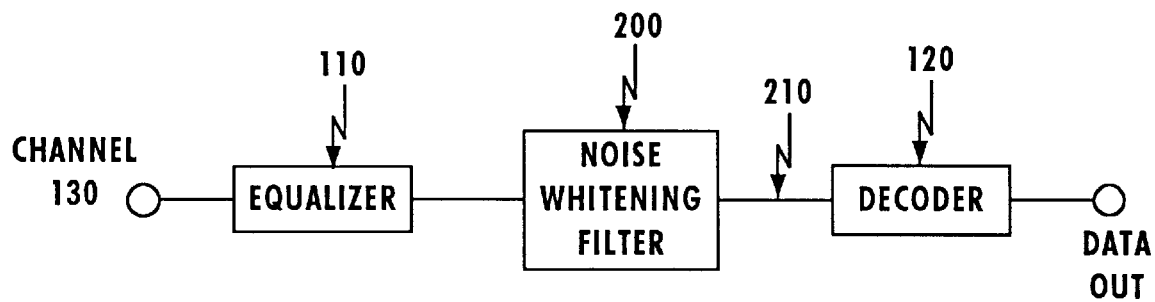
FIG. 2 is a block diagram of an improved modem receiver having a noise whitening filter interposed between an equalizer and a decoder in accordance with the invention.

FIG. 2 is a block diagram of an improved modem receiver having a noise whitening filter interposed between an equalizer and a decoder in accordance with the invention. The noise whitening filter 200 shown in FIG. 2 is essentially a predictive filter designed to remove the predictable contents of the noise after it has passed through equalizer 110. This is important because the decoder 120 performs best when receiving the signal which contains only white noise. Thus, the noise whitening filter 200 compensates for the non-uniformities in the noise spectrum shown in FIG. 1E which occur after passing through the equalizer. Thus, the signal on line 210 in FIG. 2 contains essentially white noise which is more accommodating to the decoder 120. However, the shaping induced by the noise whitening filter 200 also impacts the data or signal components received from the equalizer. Thus, the shape or spectrum of the data signal after passing through the noise whitening filter is changed.

Figure 3:
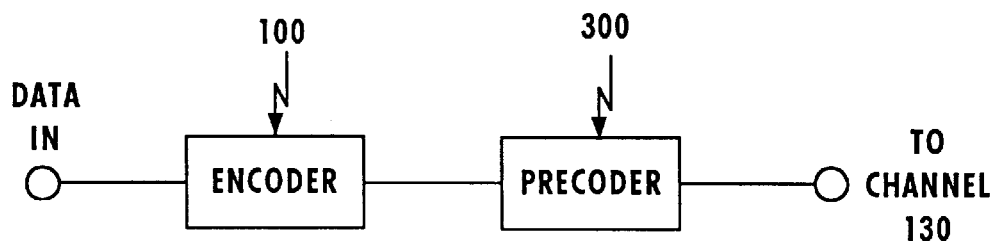
FIG. 3 is a block diagram of a precoder inserted between an encoder and a transmission channel.

FIG. 3 is a block diagram of a precoder inserted between an encoder and a transmission channel. The purpose of precoder 300 at the transmitter end of the transmission channel is to predistort the data signal so that after it emerges from the noise whitening filter 200 shown in FIG. 2, it will not be distorted. Intuitively, if the transfer function of the noise whitening filter 200 is H(nwf) the transfer function of the precoder should be essentially the inverse of that transfer function or $H(pre)=1/H(nwf)$. However, the simple inverse filtering will create a non-white data signal which is often undesirable.

Figure 4:
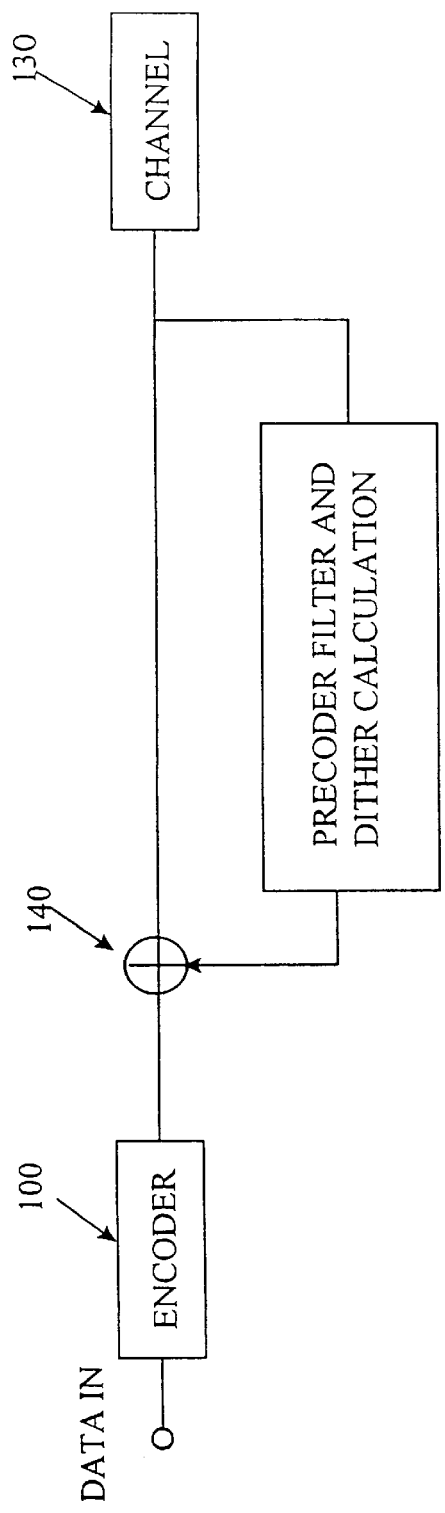
FIG. 4 is a block diagram showing the details of the precoder in FIG. 3, where a dither is added to the encoder output to form the precoder output.

FIG. 4 is a block diagram of the details of the precoder. A precoder filter, which uses the same coefficients as the remote modem receiver's noise whitening filter, takes the precoder output as its input and calculates an output, which is then used to generate a dither signal to be added to the encoder input of the precoder to generate the output of the precoder. The dither is a white-noise-like signal. Therefore, the output of the precoder still has a flat spectrum.

Figure 5:
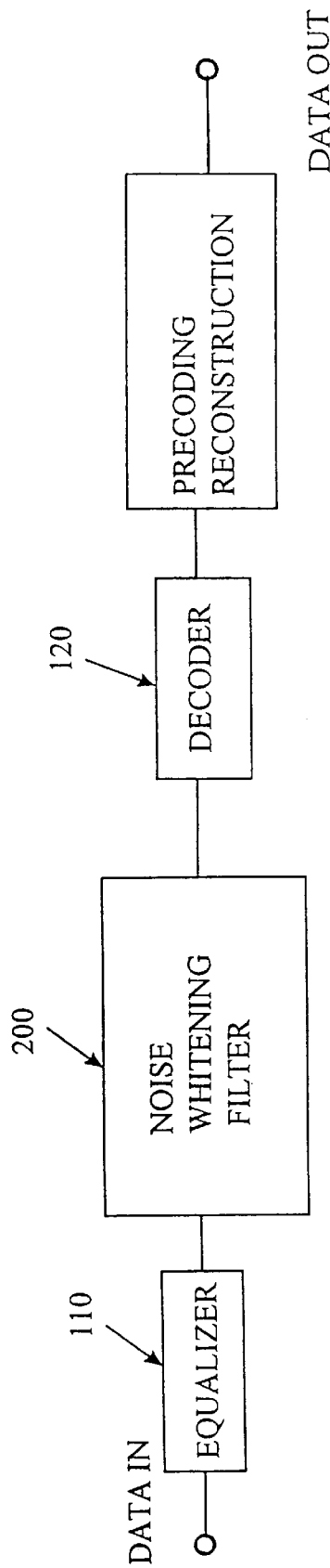
FIG. 5 is a block diagram of precoding reconstruction section added after the output of the decoder of FIG. 2 in accordance with the invention.

FIG. 5 is a block diagram of a precoding reconstruction function added after the output of the decoder of FIG. 2 in accordance with the invention. While the dither introduced by the precoder at the transmit end is removed at the receiver end of the communications link by the noise whitening filter, the signal at the noise whitening filter output may be shifted from the original encoder output signal point to another point in the signal constellation. A precoding reconstruction section is added after the decoder to recover the original signal point from the shifted signal point, as shown in FIG. 5.

Figure 6:
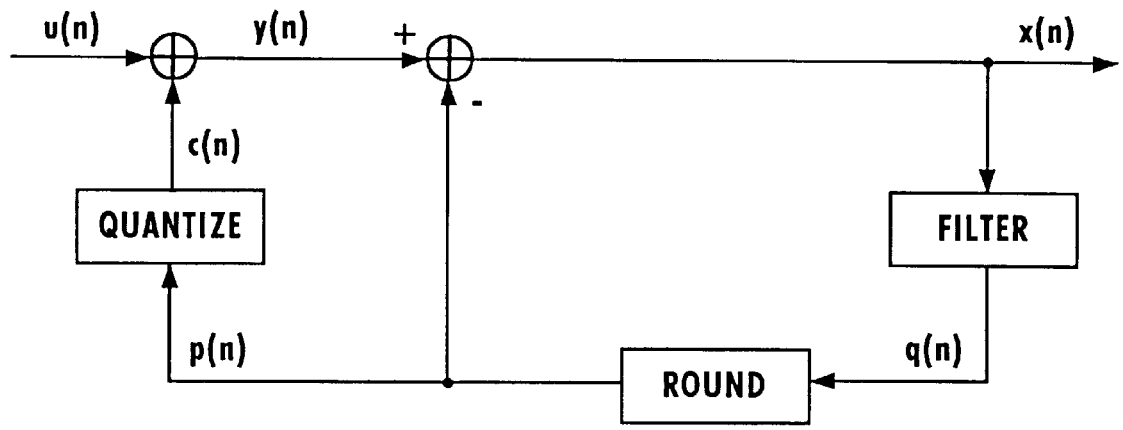
FIG. 6 is a block diagram of a precoder as specified in the V.34 recommendation.

FIG. 6 is block diagram of a precoder as specified in the V.34 recommendation.

The precoder shown in FIG. 6 receives the complex-valued signal points u(n) from the mapper and generates the complex-valued output signal x(n) according to:

$$x(n)=u(n)+c(n)-p(n) \quad \text{EQUATION (1)}$$

The complex-valued signals c(n) and p(n) are determined according to the algorithm specified in V.34 recommendation and described below. The dither signal d(n)=c(n)−p(n) is added the input u(n) to form the output x(n). The signal y(n)=u(n)+c(n) is also indicated in FIG. 6.

Note: to ensure interoperability, the signals x(n), c(n) and y(n) must be precisely the same as the algorithm specified by V.34 recommendation and described below.

The complex-valued precoding coefficients $\{h(p)=1, 2, 3\}$ are provided by the receiving modem in the MP sequence during Phase 4 of the modem start-up procedures. Their real and imaginary components are represented in the 16-bit two's-complement format with 14 bits after the binary point, and assume values in the half-open interval [−2, 2). The coefficients shall be constrained such that the absolute value of the real and imaginary components of y(n) always satisfy abs $[Y_{r,i}(n)] \leq 255$.

The precoder shall determine the signals x(n), c(n) and y(n) based on the input u(n), the precoding coefficients $\{h(p), p=1, 2, 3\}$ and the three most recent precoded symbols $\{x(n-p), p=1, 2, 3\}$, as follows (the precoding coefficients h(p) are the coefficients $C_1$, $C_2$ and $C_3$ described hereinafter).

1. Compute the filter output using complex arithmetic according to:

$$q(n) = \sum_{p=1}^{3} x(n-p)h(p) \quad \text{EQUATION 2}$$

2. Round the real and imaginary components of q(n) to the respective nearest integer multiples of $2^{-7}$ to obtain p(n). When a component falls exactly halfway between two integer multiples of $2^{-7}$, round it to the one with the smaller magnitude.

3. Quantize the real and imaginary components of p(n) to the respective nearest integer multiple of 2w to obtain c(n). When a component falls exactly halfway between two integer multiples of 2w, quantize it to the one with the smaller magnitude.

Here the scale factor w is:

$$w=1, \text{ when } b<56;$$
$$=2, \text{ when } b\geq 56, \quad \text{EQUATION 3}$$

where b is the number of bits in a high mapping frame as defined in the V.34 recommendation.

4. Compute the channel output signal y(n) and the precoded signal x(n) according to:

$$y(n)=u(n)+c(n), \quad \text{EQUATION 4}$$
$$x(n)=y(n)-p(n) \quad \text{EQUATION 5}$$

Figure 7:
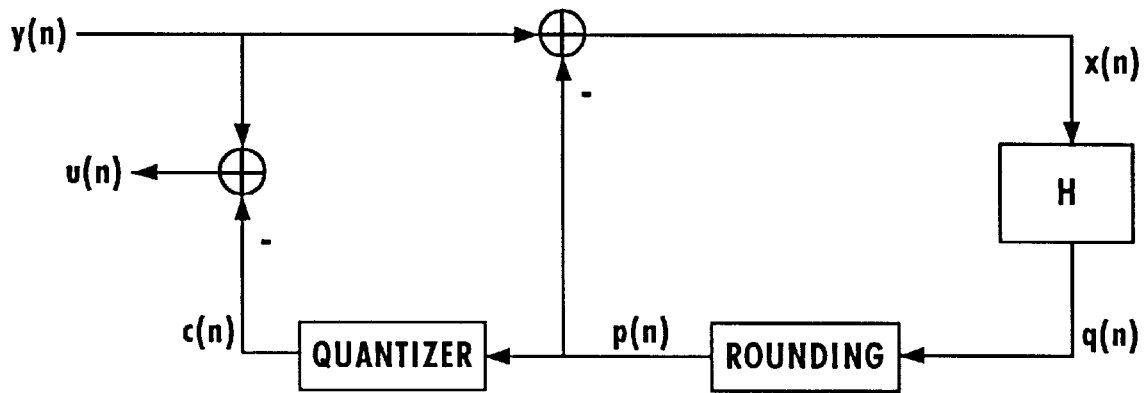
FIG. 7 is a block diagram of a circuit for precoding reconstruction in FIG. 5 in accordance with the invention.

FIG. 7 is a block diagram of a circuit for precoding reconstruction in accordance with the invention. In FIG. 7, the input y(n) is received from the output of Viterbi decoder on an expanded constellation. When there is no decision error in the decoder, this y(n) should be equal to the signal y(n) in the remote transmitter's precoder shown in FIG. 6. The output of the precoding reconstruction is the original signal u(n). The filter H utilizes the same coefficients determined as discussed more hereinafter as utilized by the noise whitening filter and the filter of the remote modem transmitter's precoder shown in FIG. 6.

Figure 8:
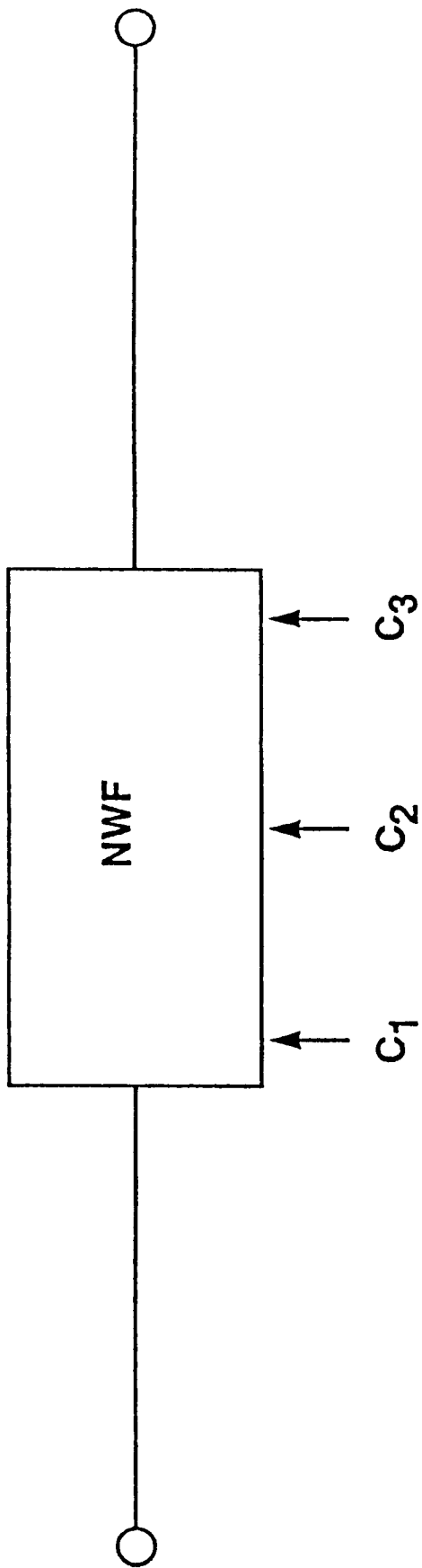
FIG. 8 is a block diagram of a noise whitening filter in accordance with the invention.

FIG. 8 is a block diagram of a noise whitening filter in accordance with the invention. The noise whitening filter is a three tap FIR filter which implements the function $1+C_1z^{-1}+C_2z^{-2}+C_3z^{-3}$. In general, coefficients $C_1$, $C_2$, and $C_3$ are complex. The noise whitening filter is trained in the final phase of training to minimize the mean square error of the equalizer output. The determination of these coefficients is a significant part of the invention. It is done as follows:

At the output of the equalizer, the error signal e(n) is in general not white. One can reduce the error by removing the correlation between adjacent error samples. For this reason, a noise whitening filter is used at the output of the equalizer. The coefficients of such a filter have to be learned during training. Since the noise whitening filter is after the equalizer, the training of its coefficients cannot start until the equalizer and all the other adaptive filters, such as echo canceler, are fully trained. Therefore, the precoding coefficient training should be near the end of phase 4 TRN training.

At the equalizer output, one decides which of the 4 (or 16 if 16-point training) constellation points the current signal belongs to, and the error e(n) is then computed. The noise whitening filter can have up to 3 taps:

$$w(n)=e(n)+c_1e(n-1)+c_2e(n-2)+c_3e(n-3).$$

The criterion for selecting coefficients $c_i(i=1,2,3)$ is to minimize $E=\Sigma|w(n)|^2$. We can let the partial derivative of E with respect to $c_i$ equal to 0:

$$\partial E/\partial c_i=0; \ i=1,2,3.$$

We then obtain three linear equations:

$$R_{11}c_1+R_{12}c_2+R_{13}c_3=B_1$$
$$R_{21}c_1+R_{22}c_2+R_{23}c_3=B_2$$
$$R_{31}c_1+R_{32}c_2+R_{33}c_3=B_3$$

where $$R_{ij}=\Sigma e^*(n-i)e(n-j)=R^*_{ji},$$
$$B_i=-\Sigma e^*(n-i)e(n).$$

The summations are over time index n for N symbols. If N equals infinity, we can simplify the equations to:

$$R_0c_1+R^*_1c_2+R^*_2c_3=-R_1$$
$$R_1c_1+R_1c_2+R^*_1c_3=-R_2$$
$$R_2c_1+R_1c_2+R_0c_3=-R_3$$

where $$R_i=\Sigma e(n)e^*(n-i), i=0,1,2,3$$

In the actual implementation, N cannot be infinity. As long as N>>3, the results should be quite accurate.

The key question is how to efficiently solve this set of linear equations to obtain $c_1$, $c_2$, and $c_3$.

In speech processing where all the signals and coefficients are real, the Levinson-Durbin algorithm can be used to solve such an equation set in a recursive manner. (See "Applications of Digital Signal Processing", edited by A.V. Oppenheim, 1978.) According to the invention, an extended version of that algorithm has been developed for complex signals and complex coefficients. This complex extension of Levinson-Durbin's recursion algorithm can be implemented as a computer program stored on a memory medium. The new complex extension of the Levinson Durbin's recursion algorithm is as follows.

(1) Let $c_1(1)=k_1=-R_1/R_0$;
(2) Let $D(1)=R_0(1-|k_1|^2)$;
(3) For $j=1,2,\ldots$ P-1:
   (3.1) $G=R_{j+i}+\Sigma_{(i=1\ to\ j)}[c_i(j)R_{j-i+1}]$
   (3.2) $k_{j+1}=-G/D(j)$
   (3.3) For $i=1,2,\ldots j$ $c_i(j+1)=c_i(j)+k_{j+1}c_{j-i+1}(j)^*$
   (3.4) $c_{j+1}(j+1)=k_{j+1}$
   (3.5) $D(j+1)=D(j)\ (1-|k_{j+1}|^2)$
(4) End The final results are in $c_1(P), c_2(P), \ldots c_p(P)$. In our case where P=3, the above algorithm can be written explicitly as:

$c_1(1)=k_1=-R_1/R_0$
$D(1)=R_0(1-|k_1|^2)$
$G=R_2+c_1(1)R_1$
$k_2=-G/D(1)$
$c_1(2)=c_1(1)+k_2c_1(1)^*$
$c_2(2)=k_2$
$D(2)=D(1)\ (1-|k_2|^2)$
$G=R_3+c_1(2)R_2+c_2(2)R_1$
$k_3=-G/D(2)$
$c_1(3)=c_1(2)+k_3c_2(2)^*$
$c_2(3)=c_2(2)+k_3c_1(2)^*$
$c_3(3)=k_3$

In the implementation, special attention must be paid in several key steps. The first is how to calculate the correlations $R_0, R_1, \ldots R_3$. $R_i$ can be computed recursively using double precision storage. Since the input signal is the equalizer output error which is usually quite small and $R_i$ is obtained by the summation of the product of two errors, the dynamic range of $R_i$ should be adjusted properly so that no overflow or underflow occurs, and the final precision is well utilized. The second is in computing $k_i$ where a complex division is required. But since D is real, only the numerator is complex. The third is that the precoding coefficients can be greater than 1, and thus we store only half of their actual value. This should be taken into consideration in the computation so that no intermediate overflow will occur. The other steps are quite straightforward. The actual details are as follows.

$k_{1r}=-R_{1r}/R_0$
$k_{1i}=-R_{1i}/R_0$
$D(1)=R_0(1-|k_1|^2)$
$C_{1r}(1)=k_{1r}/2$
$c_{1i}(1)=k_{1i}/2$
$Gr=R_{2r}+k_{1r}R_{1r}-k_{1i}$
$G_i=R_{2i}+k_{1r}R_{1i}-k_{1i}R_{1r}$
$k_{2r}=-G_r/D(1)$
$k_{2i}=-G_i/D(1)$
$c_{1r}(2)=c_{1r}(1)+k_{2r}c_{1r}(1)+k_{2i}c_{1i}(1)$
$c_{1i}(2)=c_{1i}(1)+k_{2r}c_{1i}(1)-k_{2i}c_{1r}(1)$
$c_{2r}(2)=k_{2r}/2$
$c_{2i}(2)=k_{2i}/2$
$D(2)=D(1)\ (1-|k_2|^2)$
$G_r=R_{3r}+2c_{1r}(2)\ (R_{2r}-2c_{1i}\ (2)R_{2i}+k_{2r}R_{1r}-k_{2i}R_{1i}$
$G_i=R_{3i}+2c_{1r}(2)\ (R_{2i}+2c_{1i}\ (2)R_{2r}+k_{2r}R_{1i}-k_{2i}R_{1r}$ $k_{3r}=-G_r/D(2)$
$k_{3i}=-G_i/D(2)$
$c_{1r}(3)=c_{1r}(2)+k_{3r}c_{2r}\ (2)+k_{3i}c_{2i}(2)$
$c_{1i}(3)=c_{1i}(2)+k_{3i}c_{2r}\ (2)-k_{3r}c_{2i}(2)$
$c_{2r}(3)=c_{2r}(2)+k_{3r}c_{1r}\ (2)+k_{3i}c_{1i}(2)$
$c_{2i}(3)=c_{2i}(2)+k_{3i}c_{1r}\ (2)-k_{3r}c_{1i}(2)$
$c_{3r}(3)=k_{3r}/2$
$c_{3i}(3)=k_{3i}/2$, where subscript r and I represent real and imaginary part of a complex number, respectively. The half coefficients may be greater than 1. We use overflow protection to limit them to $[-1,1)$.

If the channel has a severe attenuation distortion, the precoding coefficients will be quite big, which leads to a big increase in the signal dynamic range in the noise whitening filter output. Theoretically, for the worst case, the dynamic range can be 8 times bigger than that at the equalizer output. This will reduce the precision of the received signal greatly, and is thus undesirable. A compromise way is to limit the precoding coefficients so that they will not become too big. For this reason, V.34 specification specifies that the real and imaginary components are in the half-open interval $[-2,2]$, and the coefficients shall be constrained such that the absolute value of the real and imaginary components of signal y(n) in the precoder (see FIG. 7/V.34) are always no more than 255 to ensure no overflow can occur for y(n).

Consider the implications of this constraint. One knows that $$y(n)=u(n)+c(n)$$

If one ignores the quantization and rounding effects, one can see that $$c(n)\approx q(n)=c_1x(n-1)+c_2x(n-2)+c_3x(n-3).$$

Therefore one has $$y(n)\approx u(n)+c_1x(n-1)+c_2x(n-2)+c_3x(n-3),$$

and $$|y(n)|\approx |u(n)+c_1x(n-1)+c_2x(n-2)+c_3x(n-2)+c_3x$$
$$(n-3)|u(n)|+|c_1||x(n-1)|+|c_2||x(n-2)|+|c_3||x(n-3)|\leq |u|_{max}+(|c_1|+|c_2|+|c_3|)|x|_{max}$$

The maximum magnitude of u(n) is about 35, while the maximum magnitude of x is no more than 37.8. Therefore, one can ensure $|y(n)|\leq 255$ as long as one satisfies the following condition:

$$|c_1|+|c_2|+|c_3|<5.82. \qquad \text{(condition 1)}$$

Besides this condition, one must satisfy the following.

$$-2<\text{Real}(c_i)<2,\ \text{and}\ -2\leq \text{Imaginary}(c_i)<2. \qquad \text{(condition 2)}$$

Note that for a stable filter, all the poles have to be within the unit circle, thus $|c_1|+|c_2|+|c_3|<7$ and $|c_i|<3$. Therefore, the above conditions are not always satisfied, but unless the channel is extremely bad, they are normally satisfied. Nevertheless, one needs to check the conditions after one obtains the coefficients in the training. If the condition is not satisfied, one needs to reduce the coefficients.

Now, the question is how to reduce the coefficients. First of all, since one computes half of the actual values of the precoding coefficients, condition 2 can be satisfied by overflow protection in the computation. Therefore, one needs to check only condition 1. Preferably one actually checks if $(|c_1|+|c_2|+|c_3|)/8<0.7$.

The reason that the coefficients are too big is the noise whitening filter has to compensate too much. As a result, the poles of the precoding filter are too close to the unit circle. If one moves all the poles inward with the same factor, the coefficients will become smaller and the compensation will be less, but with a similar shape. Suppose originally one has three poles $p_1$, $p_2$, and $p_3$. The transfer function is $H(z)=1/[(1-p_1z^{-1})(1-p_2z^{-1})(1-p_3z^{-1})]=1/[1-c_1z^{-1}-c_2z^{-2}-c_3z^{-3}]$.

Therefore, one has:

$c_1=p_1+p_2+p_3$,
$c_2=-p_1p_2-p_2p_3-p_1p_3$,
$c_3=p_1p_2p_3$.

If one scales $p_1$, $p_2$, $p_3$ by a same factor k, the new transfer function will be:

$H'(z)=1/[(1-p'_1z^{-1})(1-p'_2z^{-1})(1-p'_3z^{-1})]=1/[1-c'_1z^{-1}-c'_2z^{-2}-c'_3z^{-3}]$.

Therefore, $c'_1=p'_1+p'_2+p'_3=kc_1$,
$c'_2=-p'_1p'_2-p'_2p'_3-p'_1p'_3=k^2c_2$,
$c'_3=p'_1p'_2p'_3=k^3c_3$.

One can find a small enough value for k and make sure all the conditions are satisfied. It is difficult to find the exact value for k. In the implementation, one can let k be a fixed number slightly smaller than 1(e.g., 0.9), and obtain a set of reduced coefficients, and check if condition 1 is satisfied. If it is not, one scales down this new set of coefficients again until condition 1 is satisfied.

Figure 9:
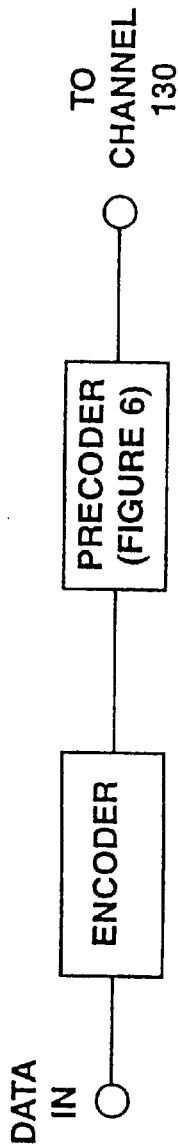
FIG. 9 is a block diagram of a V.34 modem transmitter in accordance with the invention.

FIG. 9 is a block diagram of a V.34 transmitter in accordance with the invention. The transmitter involves a standard encoder 900 and a precoder 910 illustrated in FIG. 6. In the precoder shown in FIG. 6, the transfer function of the filter is determined by the coefficients $C_1$, $C_2$ and $C_3$ which correspond to h(p) discussed above.

Figure 10:
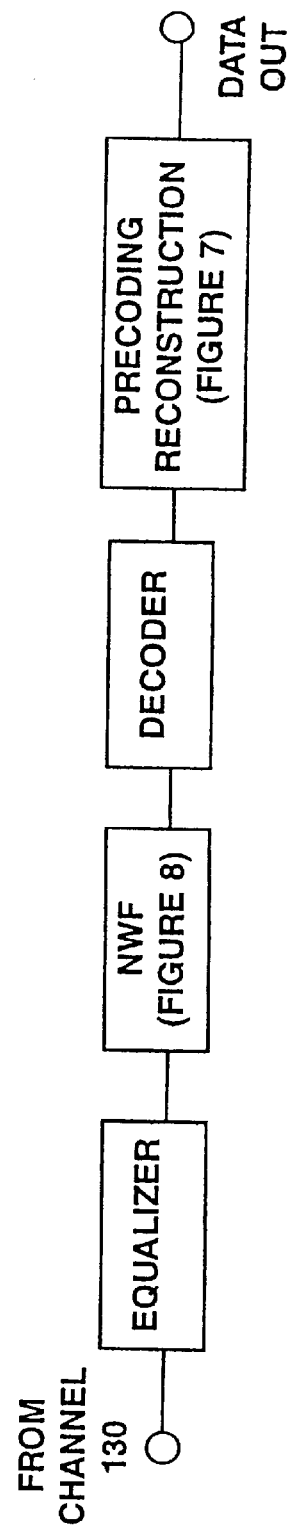
FIG. 10 is a block diagram of a V.34 modem receiver in accordance with the invention.

FIG. 10 is a block diagram of a V.34 receiver in accordance with the invention. The incoming signal from channel 130 is received at the input of equalizer 1000. The noise whitening filter 1010 is implemented as shown in FIG. 6 with the coefficients $C_1$, $c_2$ and $c_3$ determined as set forth above and as illustrated in FIG. 8. The decoder 1020 is preferably a Viterbi decoder. The output of the decoder is fed to precoding reconstruction element 1030 which is implemented as shown in FIG. 7. The transfer function H of the filter shown in the precoding reconstruction of FIG. 7 is determined by the coefficients $C_1$, $C_2$ and $C_3$ previously discussed.

Thus, the precoder of the transmitter and the noise whitening filter and precoding reconstruction unit of the receiver are linked by a common set of coefficients derived in accordance with the description above. Those coefficients provide an optimal set of characteristics for the transfer of information across two V.34 modems.

In this manner, a practical V.34 modem implementation may be achieved which permits the features of the V.34 recommendation to be implemented in a superior fashion.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

What is claimed:

1. A modem receiver for receiving encoded data information over a transmission channel and presenting it to a decoder, comprising:

a. an equalizer connected to said transmission channel; and b. a noise whitening filter, having coefficients calculated using a recursive algorithm adapted to handle complex numbers, receiving as an input the output from said equalizer and sending its output to a decoder.

2. The modem receiver as in claim 1 in which the coefficients are calculated using an extension of the Levinson-Durbin algorithm to complex numbers.

3. The modem receiver as in claim 1 in which the range of coefficient values is limited.

4. The modem receiver as in claim 1, further comprising a precoding reconstruction unit, connected to the output of said decoder, and the characteristics of said noise whitening filter and precoding reconstruction unit are set by the same coefficients.

5. A modem transmitter for receiving data from a source and encoding it for transmission over a transmission channel, comprising:

a. an encoder connected to said source; and b. a precoder, receiving input from said encoder and providing output to said transmission channel, said precoder including a filter which takes the encoder output as its input, uses coefficients from a remote modem receiver's noise whitening filter to calculate an output including a dither signal to form the precoder output signal, in which the filter coefficients are established using an extension of the Levinson-Durbin algorithm to complex numbers.

6. A V.34 compliant modem comprising:

a. a transmitter including an encoder connected to a data source; a precoder, receiving input from said encoder and providing output to a transmission channel, said precoder including a filter which takes the precoder output as its input, uses the coefficients in a remote modem receiver's noise whitening filter to calculate an output including a dither signal to form the precoder output signal; and b. a receiver, including an equalizer connected to said transmission channel; a noise whitening filter, the coefficients of which are calculated using a recursive algorithm adapted to handle complex numbers, receiving as an input the output from said equalizer and a decoder receiving the output of said noise whitening filter.

7. The V.34 compliant modem of claim 6, in which said coefficients are calculated using an extension of the Levinson Durbin algorithm to complex numbers.

8. The V.34 compliant modem of claim 7, in which the range of coefficient values is limited.

9. A communications system comprising:

a. a transmission channel;

b. a receiver, including an equalizer connected to one end of said transmission channel; a noise whitening filter, having response determined by coefficients calculated using a recursive algorithm adapted to handle complex numbers, receiving as an input the output from said equalizer and a decoder receiving the output of said noise whitening filter, and c. a transmitter including an encoder connected to a data source; a precoder, receiving input from said encoder and providing output to the other end of said transmission channel, said precoder including a filter which adds a dither signal to the output of the encoder.

10. The communications system of claim 9 in which said coefficients are calculated using an extension of the Levinson-Durbin algorithm to complex numbers.

11. The communications system of claim 9 in which said coefficients are also used to set the response of said precoder.

12. A method of adjusting a receiver to a transmission channel, comprising the steps of:
   a. modifying the received spectrum of a transmission channel by equalizing; and
   b. whitening noise output resulting from said equalizing by removing predictive components of noise by setting the response of a digital filter by applying coefficients to said digital filter which have been calculated using a recursive algorithm adapted to handle complex numbers.

13. The method of claim 12 in which said coefficients are derived using an extension of the Levinson-Durbin algorithm to complex numbers.

14. The method of claim 13 in which the range of values of said coefficients is limited.

15. A method of operating a communications system including a transmitter having a precoder and a receiver having a noise whitening filter, comprising the steps of:
   a. setting the response of said noise whitening filter with coefficients determined using a recursive algorithm adapted to handle complex numbers, and
   b. setting the response of said precoder using the same coefficients.

16. The method of claim 15 in which said coefficients are derived using an extension of the Levinson-Durbin algorithm to complex numbers.

17. The method of claim 15 in which the range of values of said coefficients is limited.

18. A computer program product, comprising:
   a. a memory medium; and
   b. a computer program stored on said memory medium, said program comprising instructions for deriving a set of coefficients for controlling the response of a filter of a modem using an extension of the Levinson-Durbin algorithm to complex numbers.

19. The computer program product of claim 18 in which said filter is a noise whitening filter.

20. The computer program product of claim 18 in which said filter is a filter of a precoder.

21. The computer program product of claim 18 in which said filter is a filter of a precoding reconstruction unit.

* * * * *